US010831268B1

(12) United States Patent
Golard et al.

(10) Patent No.: US 10,831,268 B1
(45) Date of Patent: Nov. 10, 2020

(54) SYSTEMS AND METHODS FOR USING EYE TRACKING TO IMPROVE USER INTERACTIONS WITH OBJECTS IN ARTIFICIAL REALITY

(71) Applicant: Facebook Technologies, LLC, Menlo Park, CA (US)

(72) Inventors: Andre Golard, Seattle, WA (US); Bo Asp Andersen, Seattle, WA (US); Immo Andreas Schuetz, Redmond, WA (US); Karol Constantine Hatzilias, Kenmore, WA (US); Kelly Ingham, Redmond, WA (US); Martin Henrik Tall, Redwood City, CA (US); Neeraj Choubey, Belmont, CA (US); Thomas Scott Murdison, Kirkland, WA (US); Sharvil Shailesh Talati, Mercer Island, WA (US); Robert Dale Cavin, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/354,835

(22) Filed: Mar. 15, 2019

(51) Int. Cl.
*G06F 3/01* (2006.01)
*G06T 19/00* (2011.01)
*G06F 3/0484* (2013.01)
*G06F 3/16* (2006.01)
*G10L 15/22* (2006.01)

(52) U.S. Cl.
CPC .............. *G06F 3/013* (2013.01); *G06F 3/017* (2013.01); *G06F 3/04842* (2013.01); *G06F 3/167* (2013.01); *G06T 19/003* (2013.01); *G10L 15/22* (2013.01); *G10L 2015/223* (2013.01)

(58) Field of Classification Search
CPC .......... G06F 1/163; G06F 3/012; G06F 3/013; G06F 3/017; G06F 3/0488; G06F 3/167; G06F 3/011; G06F 3/0304; G06F 3/04842; G06K 9/00604; G06K 9/00671; G06T 19/006; G02B 27/0093; G02B 27/017; G02B 2027/0138; G02B 2027/014; G02B 2027/0178; G02B 2027/0187
See application file for complete search history.

(56) References Cited

U.S. PATENT DOCUMENTS

| 8,214,309 | B1 | 7/2012 | Khosla et al. |
| 8,374,687 | B2 | 2/2013 | Mathan et al. |
| 2015/0302251 | A1 | 10/2015 | Smith et al. |
| 2016/0274762 | A1* | 9/2016 | Lopez ................... G06T 19/006 |
| 2017/0108838 | A1* | 4/2017 | Todeschini ........... H05B 47/105 |
| 2017/0235360 | A1 | 8/2017 | George-Svahn |
| 2018/0157398 | A1* | 6/2018 | Kaehler .................. G06F 3/011 |

OTHER PUBLICATIONS

Preinterview First Office Action received for U.S. Appl. No. 16/356,594 dated Mar. 5, 2020, 13 pages.

\* cited by examiner

*Primary Examiner* — Nelson M Rosario
(74) *Attorney, Agent, or Firm* — FisherBroyles, LLP

(57) ABSTRACT

The disclosed computer-implemented method may include: identifying, using an eye-tracking system, an object within a scene viewed by a user; identifying, within a database of object interaction commands, a subset of commands that apply to the object viewed by the user; and presenting, to the user, the subset of commands that apply to the object. Various other methods, systems, devices, and computer-readable media are also disclosed.

19 Claims, 9 Drawing Sheets

SYSTEMS AND METHODS FOR USING EYE TRACKING TO IMPROVE USER INTERACTIONS WITH OBJECTS IN ARTIFICIAL REALITY

BACKGROUND

Virtual reality (VR) systems and augmented reality (AR) systems (collectively known as artificial reality systems) typically include a display element configured to present images of real and virtual objects to users. These systems also often include a dedicated peripheral that translates hand and finger movements into input signals that enable users to interact with the displayed images. Unfortunately, traditional peripherals may artificially separate the user from their environment, which may prevent the user from having a fully immersive experience. The present disclosure, however, identifies and addresses a need for improved artificial reality systems that incorporate eye tracking to provide a more immersive experience than interfaces that are predominantly reliant on handheld peripherals for user input.

SUMMARY

As will be described in greater detail below, the present disclosure describes systems and methods for using eye tracking to improve user interactions with objects in AR, VR, and other artificial reality environments. In one example, a computer-implemented for accomplishing such a task may include (1) identifying, using an eye-tracking system, an object within a scene viewed by a user, (2) identifying, within a database of object interaction commands, a subset of commands that apply to the object viewed by the user, and (3) presenting, to the user, the subset of commands that apply to the object.

In one embodiment, the step of identifying the subset of commands may include generating (or modifying) a neural network and inputting vectors corresponding to both an eye gaze of the user and features associated with the object to the neural network. The method may further include identifying one or more physical responses of the user with respect to the object and inputting additional features corresponding to the physical responses to the neural network. The subset of commands may include a tag, control information, and/or a keyword associated with the object, among other information, as detailed below.

In another embodiment, the method may further include receiving user input associated with the subset of commands that apply to the object. In this embodiment, the user input may include at least a portion of an utterance by the user and/or or at least a portion of a gesture performed by the user. In one example, the user input may include a selection of a command to be executed in connection with the object. In this example, the method may further include executing, in response to receiving the user input, the selected command.

The step of presenting the subset of commands may include displaying, using an artificial reality device, the subset of commands in a field of view of the user, presenting the subset of commands using an audio device, and/or presenting the subset of commands using a tactile display. In one embodiment, the subset of commands may represent less than all of the entirety of commands in the database. In another embodiment, the method may further include identifying setting information associated with the object.

A corresponding device is also described. The device may include at least one memory device that stores computer-executable instructions and at least one processor configured to access the memory device. The processor may be configured to execute the computer-executable instructions to (1) identify, using an eye-tracking subsystem, an object within a scene viewed by a user, (2) identify, within a database of object interaction commands, a subset of commands that apply to the object viewed by the user, and (3) present, to the user, the subset of commands that apply to the object.

A computer-readable medium storing computer-executable instructions for performing the above-described method is also disclosed. In one example, these instructions, when executed by at least one processor, may cause the processor to perform operations including (1) identifying, using an eye tracking system, an object within a scene viewed by a user, (2) identifying, within a database of object interaction commands, a subset of commands that apply to the object viewed by the user, and (3) presenting, to the user, the subset of commands that apply to the object.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
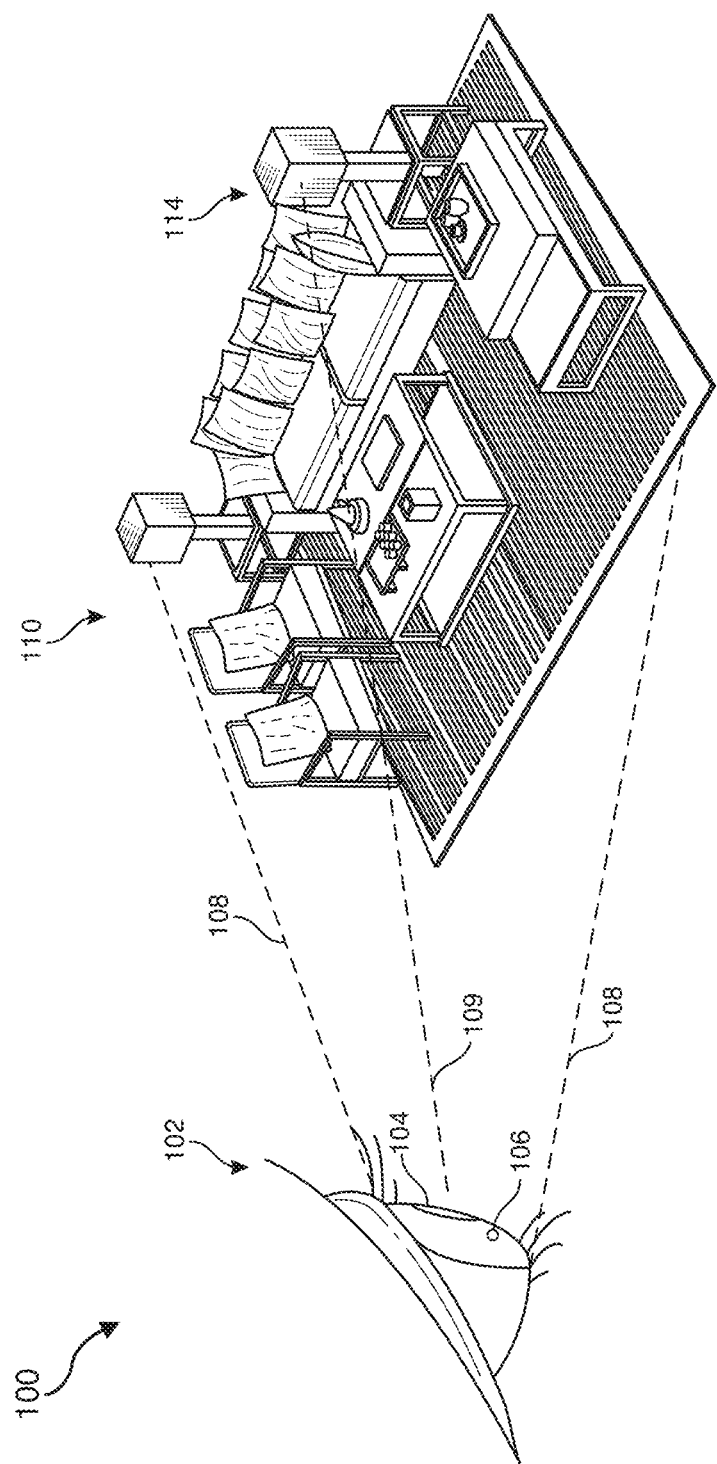
FIG. 1 is an illustration of an exemplary scenario in which eye tracking can be used to improve user interactions with objects in artificial reality.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to using eye tracking to improve user interactions with objects in AR, VR, and/or other artificial reality environments. As will be explained in greater detail below, embodiments of the present disclosure may be directed to identifying, using an eye-tracking system (and, in some cases, object-recognition algorithms or techniques), features or objects within a user's field of view. The disclosed systems may then use data gathered by the eye-tracking system to reduce the scope of possible contextual features and/or commands that may be displayed or executed for a given object and/or scene. For example, a subset of commands that apply to an object viewed by a user may be identified within a library or database of object interaction commands (e.g., the disclosed systems may identify, within a library that contains hundreds of possible action/features, only a few potentially relevant actions/features that could apply to an object of interest). As noted, this subset of commands may be less than the total number of possible commands in the database. This reduction of all possible commands to a subset of relevant commands may serve to increase the speed and efficiency of the artificial reality device and provide a more seamless experience for the user when interacting with objects and/or devices in the artificial reality environment.

In some embodiments, the disclosed systems may pre-fetch information (e.g., contextual information and/or commands) related to features of interest (e.g., tags, keywords, control information, and/or the like) within a database of object interaction commands associated with objects in the user's field of view. In addition, the disclosed systems may communicate with objects and/or devices in the user's environment (e.g., Internet-of-things (IoT) devices, etc.) to determine, for example, what specific commands and parameters are available for a given device. For example, a system may present information (e.g., interface information) associated with a device to the user to facilitate interaction with the device, other objects, and the like, in an artificial reality environment. In some cases, this information may be determined based at least in part on the pre-fetched information.

In one embodiment, this pre-fetched interface information may be filtered in real time or near real time based on user speech or gestures. For example, the first syllable of an utterance may be used to reduce the number of possible commands for interacting with an object, and the reduced number of possible commands may be displayed to a user accordingly. In another embodiment, eye tracking and speech recognition data may be combined with input data from another user device (e.g., a controller, a keyboard, a mouse, a laser pointer, etc.) to increase the accuracy of displayed interface information and/or interactions with the environment.

As noted, embodiments of the present disclosure may have one or more advantages over conventional systems. For example, embodiments of this disclosure may include techniques to pre-fetch user instructions and/or commands in memory in order to reduce the time required to access such commands, thereby increasing the operational efficiency of the associated device. In addition, embodiments of this disclosure may create a relatively seamless and/or continuous experience for a user by reducing the amount of delay associated with user interactions with various objects (e.g., in the real world or with virtual representations of real-world objects).

Embodiments of the present disclosure may also help facilitate user interactions with computing systems. For example, embodiments of this disclosure may be used to configure settings for one or more devices in a smart home environment, a connected office environment, an IoT environment, and/or the like. In another example, embodiments of the present disclosure may improve user interactions with information retrieval and processing systems, such as Internet browsers or other information sources that may be more efficiently navigated using eye tracking.

FIG. 1 is an exemplary illustration demonstrating how eye tracking can be used to improve a user's interaction with objects in an environmental context 100. FIG. 1 illustrates an eye 102 of a user gazing on an exemplary scene 110, which may be a real-world setting and/or a visual representation (e.g., images and/or video) of the real world. In one example embodiment, all or a portion of this visual representation may be created by a device, such as the near-eye display (NED) and/or head-mounted display (HMD) illustrated in FIGS. 9 and 10 and described below. In some examples, the visual representation may represent images or video provided by so-called pass-through cameras, such as external-facing RGB cameras mounted on an NED or HMD. In other examples, all or a portion of the visual representation of the real world may be obtained and/or determined at least in part from data stored in memory on a device, such as an NED or HMD, and/or from data stored on an external device (e.g., a mobile phone, cloud server, or other computing device) and transferred over a wireless or wired link (e.g., Wi-Fi network, cellular network including 5G networks, and/or the like). As will be described in greater detail below, in some examples the visual information presented in the user's field of view may include computer-generated images and/or information, such as command prompts for interacting with an object or device, device setting information, and/or the like. This visual information may be presented using any suitable display technology, including via a light emitting diode (LED) display, a microLED display, an organic light emitting diode (OLED) display, a laser-based display, a liquid crystal on silicon (LCoS) display, a waveguide, combinations thereof, and/or the like.

As shown in FIG. 1, scene 110 may include a variety of virtual or real-world objects, such as couches, lamps, electronic devices, and/or the like. Scene 110 may include static objects (e.g., non-moving objects) and/or dynamic objects (e.g., moving robots, components, living animals including dogs, other humans, etc.). Scene 110 may represent any suitable environment and may include a variety of different objects, including devices with which a user may interact, such as object 114. In one embodiment, object 114 may represent a wireless-enabled device (e.g., a Wi-Fi device, a cellular device, a Bluetooth device, an IoT, and/or the like). In another embodiment, object 114 may include a transceiver that may be configured to communicate with a user device (e.g., an HMD and/or an NED). In some examples, object 114 may transmit availability information associated with the object (e.g., information designating that object 114 is available for data communications at a particular time). In another example, object 114 may include a group of related objects, such as a group of related IoT devices. In some examples, object 114 may be configured to operate on a 5G millimeter wave band, for example, using a 5G new radio-based transceiver. Further, object 114 may include a visual indicator signifying ongoing communication with a user device. As indicated above, object 114 may represent both real and virtual objects. For example, object 114 may represent a lamp, a virtual representation of a lamp, and/or a combination of the same (such as a virtual "skin" overlaid on a real-world lamp).

In some examples, the disclosed systems may identify, using eye tracking, one or more objects (such as object 114) within a scene (such as scene 110 in FIG. 1) viewed by a user. In one example, the disclosed systems may use eye tracking to first identify the user's field of view (as represented by field of view 108 in FIG. 1) and/or the user's eye gaze (i.e., the location within a scene on which the user's eyes are focused, as represented by gaze 109 in FIG. 1). The disclosed systems may then identify (using, e.g., machine-learning or computer-vision algorithms) an object in the user's field of view and/or an object on which the user's gaze is focused (such as object 114 in FIG. 1).

The disclosed systems may track the eye 102 of a user (and thus determine the eye gaze and/or field of view of the user) using any of a variety of eye-tracking systems and techniques. In one example, the disclosed systems may track a user's eye by tracking the movement of the user's pupil 104 and/or using so-called glints (also known as corneal reflections or Purkinje images), such as glint 106 in FIG. 1. A more detailed discussion of possible eye-tracking systems and techniques will be provided in connection with FIGS. 4 and 5 below.

The systems described herein may identify an object in a user's field of view and/or an object on which the user's gaze is focused in a variety of ways. In one embodiment, the disclosed systems may first analyze a scene (such as scene 110 in FIG. 1) using an object-recognition algorithm (e.g., using a machine vision algorithm), which may allow for the scene to be mapped into a number of objects that may be analyzed computationally by a processor of a device. This scene may be pre-mapped or may be mapped in real time or near real time. In one example, the scene may include information derived from an indoor map or from an outdoor map and/or may include information based on global-positioning system (GPS) signals or similar locational signals. A more detailed discussion of possible approaches to identifying objects within scenes will be provided in connection with FIG. 6 below.

Upon identifying an object within a scene viewed by a user, the disclosed systems may then identify, within a library or database of object interaction commands, a subset of commands that apply to the object in question. In some examples, object interaction commands may refer to actions that may be performed in connection with a real or virtual object or group of objects. Non-limiting examples of object interaction commands may include displaying information about at least one object, modifying a user-configurable setting of the object, searching a database for information related to the object, providing a different view (e.g., a magnified view) of the object, transmitting and/or receiving a file associated with the object, combinations thereof, and/or the like. In some embodiments, the subset of commands may include a tag, control information, or a keyword associated with the object. In particular, a tag may refer to a textual-based, image-based, video-based, or audio-based description of the object. For example, a tag may describe an aspect of the object, may include ownership information associated with the object, category information associated with the object, pricing information associated with the object, memory-size information associated with the object, related object information, combinations thereof, and/or the like. In addition, control information may refer to information that specifies a user interaction that modifies a property (e.g., a setting) of the object. Non-limiting examples may include turning the object on or off, adjusting a property (e.g., temperature, brightness, volume, etc.) of the object, initiating or terminating communication with the object, combinations thereof, and/or the like. In another embodiment, a keyword may be similar to a tag; however, a keyword may include textual descriptions of the object that may be used in connection with databases (e.g., databases accessible via a search engine). Such keywords may facilitate users searching for an object and/or related objects in an artificial reality environment. In another aspect, keywords may include spelling and/or grammatical variations of the textual descriptions of the object, including common misspellings of such textual descriptions.

In some cases, object interaction commands may be initiated by a user of an artificial reality device. For example, if the object represents a lamp, then a user may command the artificial reality device to turn on the lamp, turn off the lamp, turn on the lamp for a predetermined period of time (e.g., five minutes), dim the lamp, etc. As explained in greater detail below, the user may input this command in a variety of ways, such as using speech input, a handheld controller, and/or the like. In some examples, the artificial reality device may perform the requested action by interfacing with the lamp or an intermediary device, such as a smart outlet.

The disclosed systems may store, process, and/or modify object interaction commands, information associated with scene(s) and/or object(s) (e.g., navigational information associated with a scene, news regarding scene(s) and/or object(s), user comments regarding scene(s) and/or object(s), trending searches related to scene(s) and/or object(s), advertisement associated with object(s) in scene(s), combinations thereof, and/or the like), and/or contextual information (e.g., user search histories associated with scene(s) and/or object(s), information associated with user profiles that have previously interacted with the scene(s) and/or object(s), description of operational statuses of the object(s), combinations thereof, and/or the like) in a variety of ways. For example, this information may be stored on the artificial reality device itself, on an external computing device (such as a laptop or charging case with compute or storage capabilities), and/or a cloud-computing platform.

In one example, the phrase "subset of commands that apply to the object" may refer to only those commands within a library or database of commands that could apply (as opposed to the totality of commands within a library that may or may not apply) to a particular object. For example, a command such as changing the brightness level that may apply to a given object such as a lamp may not apply to a different object such as a thermostat. Further, a command that may apply to a given object at a given operational state of the object may not be applicable in a different operational state of the object. For example, a command to increase the brightness of the lamp may not be applicable to a lamp that is powered off. Accordingly, this "subset of commands" may have a reduced dimensionality with respect to the entirety of commands in a database.

The disclosed systems may identify commands that apply to an object viewed by a user in a variety of ways. In one example, the disclosed systems may identify, within a database of object interaction commands, a subset of commands that apply to an object based on the object's ID, as determined via machine learning. In another example, the disclosed systems may obtain or generate a neural network (as further shown and described in connection with FIG. 6 below) and may input, using information obtained from an eye-tracking subsystem, vectors corresponding to both an eye gaze of the user and features associated with the user's point of focus within a scene to the neural network. The neural network may then use this information to identify commands that apply to the point of focus (such as an object on which the user is focused), as described in greater detail below in connection with FIG. 6.

Upon identifying a subset of commands that apply to a particular object viewed by a user, the disclosed systems may then present the identified subset of commands to the user. The disclosed systems may present this subset of commands in a variety of ways using a variety of techniques. In one example, the disclosed systems may display, using an artificial reality device, the subset of commands in the user's field of view. In other examples, the disclosed systems may present the subset of commands using an audio device or a tactile display. In another example, the disclosed systems may cause an external device (e.g., a mobile phone or laptop) to display the subset of commands.

Figure 2:
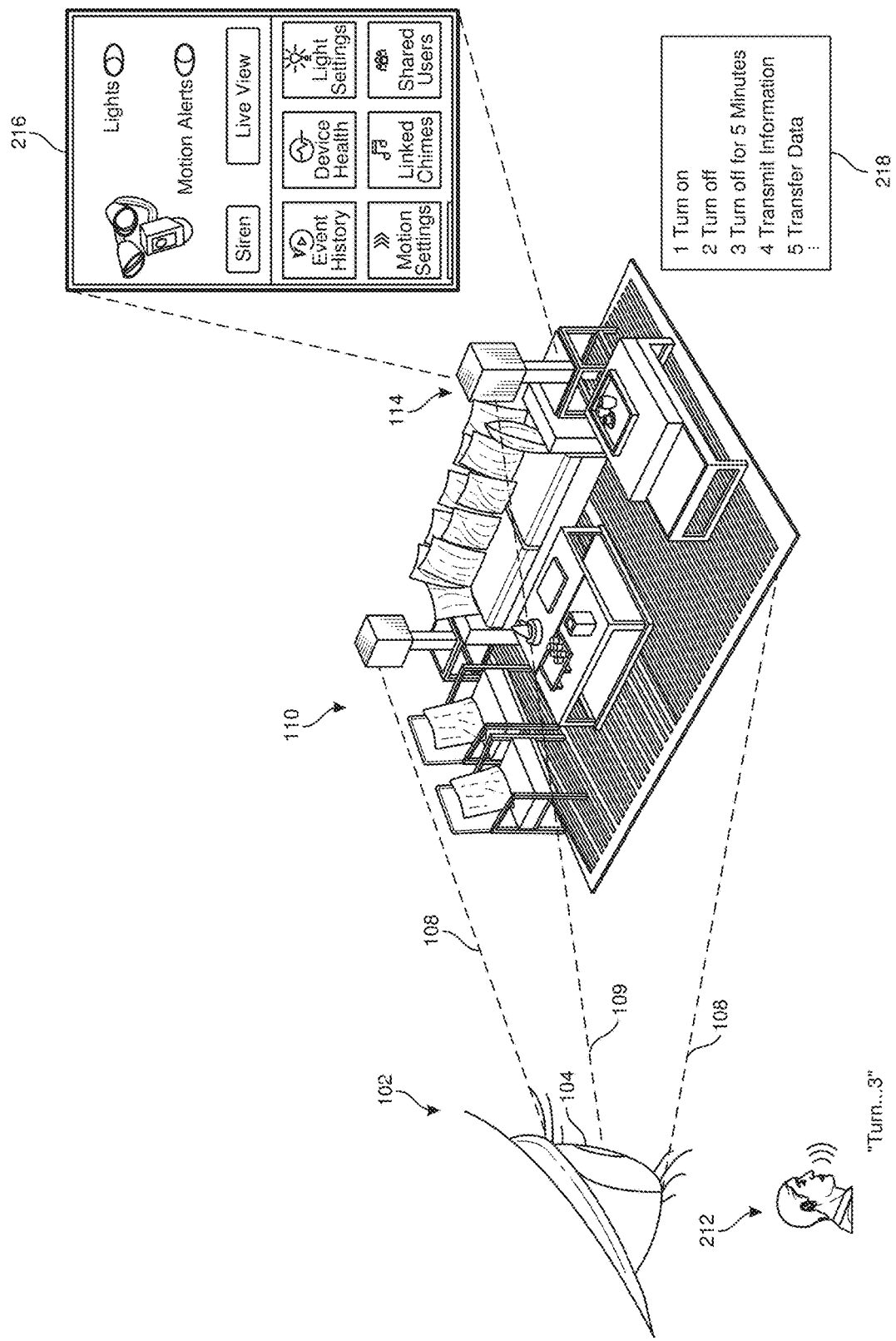
FIG. 2 is an illustration of exemplary object interaction commands that can be identified and displayed to a user based on data obtained by an eye-tracking system.

FIG. 2 is an illustration of exemplary object interaction commands that can be identified and displayed to a user. As shown in FIG. 2, a first menu 216 (e.g., a setting menu) may be presented to a user in real time or in near real time. In this example, first menu 216 may represent or be based on the subset of commands identified above. That is, first menu 216 may only contain object interaction commands or other information that apply to the object in question (in this case, object 114, on which the user's gaze 109 is currently focused).

As shown in FIG. 2, first menu 216 may include setting information associated with the identified object. In some examples, setting information may refer to information that describes an adjustable operational configuration of an object (e.g., a security configuration, a power-saving configuration, a bandwidth usage configuration, a display brightness configuration, combinations thereof, and/or the like). For example, for object 114 (which represents a lamp), the setting information may include, but not be limited to, a brightness setting of the lamp, a color setting of the lamp, a power mode setting of the lamp, an automatic shut-off setting of the lamp, and/or the like. In another embodiment, first menu 216 may also include similar setting options for another device. In some examples, this setting information may be configurable by the user.

As detailed above, the disclosed systems may also display commands that may be executed in connection with the object in question. For example, the disclosed systems may display a second menu 218 for object 114 that contains a list of possible commands that a user may execute in connection with object 114. As with first menu 216, second menu 218 may represent or be based on the subset of commands identified above. That is, second menu 218 may only contain object interaction commands that apply to the object in question (in this case, object 114, on which the user's gaze 109 is currently focused).

The systems described herein may present first menu 216 and second menu 218 in a variety of ways. For example, the disclosed systems may present second menu 218 either subsequent or prior to first menu 216 (as determined, e.g., by user settings). In another example, the disclosed systems may pre-populate second menu 218 with the most recent commands invoked by the user or the most popular commands invoked by given user or a group of users in a network. In additional examples, the disclosed systems may prepopulate second menu 218 with an alphabetical list of possible commands associated with object 114, as determined using the techniques described herein.

In some examples, the disclosed systems may only display first menu 216 after the user's eye 102 has fixated on a particular location (e.g., object 114) for a predetermined period of time (e.g., five seconds). In other examples, the disclosed systems may display first menu 216 immediately upon determining that a user's eye gaze has focused on an identified object or point of interest in scene 110.

As detailed above, the systems described herein may identify and track the eye gaze of a user in a variety of ways. For example, the disclosed systems may periodically or continuously monitor a user's gaze (using, for example, the eye-tracking systems and techniques described herein). In another example, the systems described herein may track and record the dwell times of the user's eye(s). This dwell time may, in some examples, refer to a period of time that the user gazes on a given point (or object) within a scene.

In some examples, the disclosed systems may analyze one or more additional contextual factors to determine whether the user is genuinely or significantly interested in a specific point within a scene, rather than being distracted or otherwise not significantly interested in this point. These additional factors may include eye-gaze dwell time (e.g., whether the user has gazed upon a specific point for a certain period of time), pupil-dilation information (provided, e.g., by an eye-tracking system), various measured physiological responses (e.g., changes in heart rate and/or skin conductance), etc. For example, the disclosed systems may compare a measurement of the amount of time a user has spent gazing upon, or focused upon, a point within the field of view with a threshold amount of time. The threshold may be defined statically and/or dynamically, etc. Accordingly, by performing this comparison, the disclosed systems may conclude that the user has gazed upon a specific point for a sufficient amount of time to indicate that the point is significantly interesting to the user.

In some embodiments, the above-described dwell times may be recorded, analyzed, and used to generate a heat map. In some examples, this heat map may indicate the amount of time a user's gaze has focused on particular portions of a scene (such as scene 110 in FIG. 1). In these examples, portions of the scene 110 that correspond to a relatively high dwell time may be colored red or may have a visual indication having a higher density in comparison with portions of the scene 110 that correspond to a relatively lower dwell time. In some embodiments, this heat map may be used to determine the level of interest that a user has in an object within a scene and/or the level of interest that groups of users have on particular objects. For example, the disclosed systems may use a heat map to identify that a user (or a group of users) has spent a relatively significant amount of time (e.g., a few seconds) gazing at a particular object that is not the current focus of user interactions. In this example, the disclosed systems may display information to the user(s) that may prompt the user(s) to actively engage with the object using the techniques disclosed herein. For example, the heat map may indicate that the user(s) spent time gazing at a thermostat in addition to a lamp that they are currently interacting with. The disclosed systems may then display a suggestion to the user(s) to change a setting of the thermostat, even though the user(s) were not directly interacting with the thermostat.

In some examples, the disclosed systems may (after presenting the subset of commands that apply to the identified object) receive user input (e.g., at least a portion of an utterance by the user and/or at least a portion of a gesture performed by the user) that includes a selection of a command to be executed in connection with the object (e.g., option 3 in second menu 218 in FIG. 2 ("Turn off for five minutes")). The disclosed systems may then execute, in response to receiving the user input, the selected command (by, e.g., turning off the lamp for five minutes).

The disclosed systems may receive user input using any suitable system or technique. In one example, the disclosed systems may analyze audio signals (detected, e.g., using microphones or other sensors on an NED or HMD) to identify user commands and/or to detect user-spoken words related to features of interest in the user's field of view. In another example, the disclosed systems may analyze video signals (captured, e.g., by external-facing cameras or other sensors on an NED or HMD) to identify gestures (such as a pointing motion or the number of fingers displayed by the user) used to select object interaction commands. The disclosed systems may also receive user input from external devices, such as a handheld controller, a keyboard, a mouse, a laser pointer, etc. In some examples, the disclosed systems may also use pupil-dilation information provided by an eye-tracking system and/or measured physiological responses (e.g., changes in heart rate and/or skin conductance) to identify a user's selection of a specific object interaction command.

In one example, the disclosed systems may filter and/or otherwise limit or reduce the total number of possible commands that could apply to an object based on some form of user input (e.g., based on speech, as determined using voice-recognition techniques, and/or gestures, as determined using gesture-recognition techniques, as will be described below). For example, the disclosed systems may modify second menu 218 to highlight, sort, or show fewer commands based on verbal cues and/or gestures). In an example usage scenario, a user may say the word "turn," as illustrated by diagram 212 in FIG. 2. In response, the disclosed systems may display commands starting with the word "turn" in second menu 218, allowing the user to select the third option (e.g., "turn off for five minutes") by merely saying the word "three." In another example, the user may select the third option merely by holding up three fingers.

The disclosed systems may monitor for user input (such as spoken commands and gestures) in a variety of ways. In one example, these systems may monitor for user input continuously in real time or in near real time. In some embodiments, the disclosed systems may first process a user's voice via a calibration step in order to determine the nuances of a given user's speech (and thus correctly identify spoken commands). In some examples, the disclosed systems may train a machine-learning algorithm (e.g., a neural network) based on the user's speech to enable the device (e.g., an HMD and/or an NED) to better identify the same.

In another embodiment, the disclosed systems may present additional information, commands, and/or menus to the user based on information obtained from other users or devices. In some examples, this additional information may be based on other user communications with object 114, other object communications with object 114 (e.g., machine-to-machine communications), descriptions of ongoing operational states of object 114, and/or the like. For example, when the user is interacting with a lamp, the disclosed systems may present information regarding brightness settings of additional lights in the user's environment.

Figure 3:
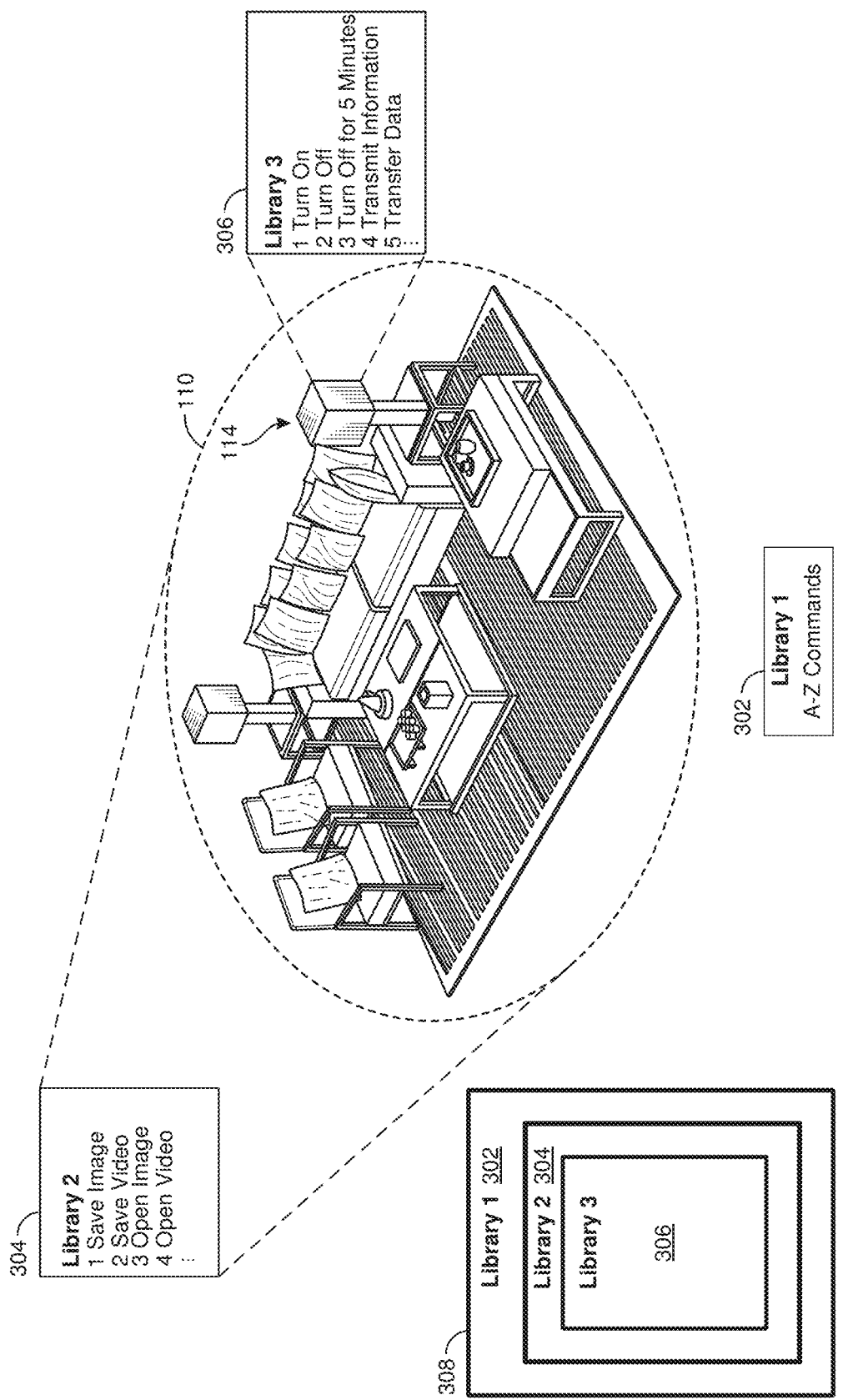
FIG. 3 is an illustration of the potential hierarchical relationships that may exist between libraries of object interaction commands.

The various object interaction commands described herein may be organized in a variety of ways. In some examples, these object interaction commands may be hierarchically related. FIG. 3 is an illustration of the potential hierarchical relationships that may exist between libraries used to store object interaction commands. As show in diagram 308, a first library 302 may include commands of a more wide-ranging nature and at a relatively highest level of generality. For example, first library 302 may include inter-scene related commands, commands that may be executed at any time in relation to objects and/or scenes in the user's field of view, commands that may be executed at any time and that are not necessarily related to objects and/or scenes in the user's field of view, and/or the like.

In contrast, a second library 304 may include fewer commands than first library 302 and may include commands that are narrower in scope than the commands in first library 302. For example, second library 304 may include commands that are related to a given scene (e.g., scene 110), as opposed to commands that may apply to all scenes (or no scenes at all), as mentioned above. Similarly, a third library 306 may include fewer commands than second library 304 and/or may include commands that are narrower in scope than the commands of either second library 304 or first library 302. In one embodiment, third library 306 may include commands that are related to one or more objects in the scene 110, as opposed to the scene in which the objects are located or generated within, as described above.

For example, first library 302 may represent the totality of all possible commands that can be executed in connection with objects in an artificial reality environment. For example, first library 302 may include commands such powering on or off an artificial reality device (e.g., an HMD) that the user is wearing, modifying display settings of the device, turning on or turning off eye-tracking capabilities associated with the device, opening a browser listing devices and configuration settings in one or more user-accessible scenes in an artificial reality environment, combinations thereof, and/or the like.

In contrast, second library 304 may represent a subset of commands (e.g., scene interaction commands) of the first library 302. In one embodiment, second library 304 may represent commands associated with a given scene 110. In some examples, second library 304 may represent the sum total of predetermined commands (e.g., library of commands) associated with a given scene (such as scene 110), which may be identified using a scene ID generated using machine-learning techniques. For example, second library 304 may include commands including, but not limited to, taking an image of scene 110, saving an image of scene 110, taking a video of scene 110, saving a video of scene 110, opening one or more images and/or videos associated with scene 110, requesting information related to scene 110 and/or other scenes via an internet browser, ordering products associated with scene 110, and/or any other suitable command.

Similarly, third library 306 may represent a subset of commands from second library 304 and, by extension, a subset of commands from first library 302. In one example, third library 306 may represent commands associated with a given object (such as object 114). In some examples, third library 306 may represent the sum total of predetermined commands (e.g., library of commands) associated with an object. Third library 306 may include one or more commands associated with an object or a group of objects in a scene. For instance, in an example where the object is a lamp, the commands may include, but not be limited to, turning on the device, turning off the device, turning off the device for a predetermined period of time (e.g., five minutes), transmitting information, transferring data, combinations thereof, and/or the like.

In some embodiments, the disclosed systems may arrange the libraries illustrated in FIG. 3 in a particular order, such as alphabetically. The disclosed systems may also compress these libraries using any suitable compression algorithm to reduce the size of the same. The disclosed systems may also store these libraries in a variety of locations, including at least partially on the memory of a device (e.g., an HMD and/or an NED) worn by the user and/or on an external device (e.g., a mobile phone, cloud server, or other computing device). In one embodiment, these libraries may include commands derived from other scenes or from a third-party database (accessible, e.g., via the Internet).

As noted, the disclosed systems may use the various libraries and databases described herein to identify a subset of commands that apply to the object viewed by the user. Moreover, the disclosed systems may use any suitable machine-learning algorithm (such as a neural network) to identify the object and/or the subset of commands that apply to the same. A more detailed discussion of potential AI or machine-learning-based techniques that may be used to perform such a task will be provided in connection with FIG. 6 below.

Figure 4:
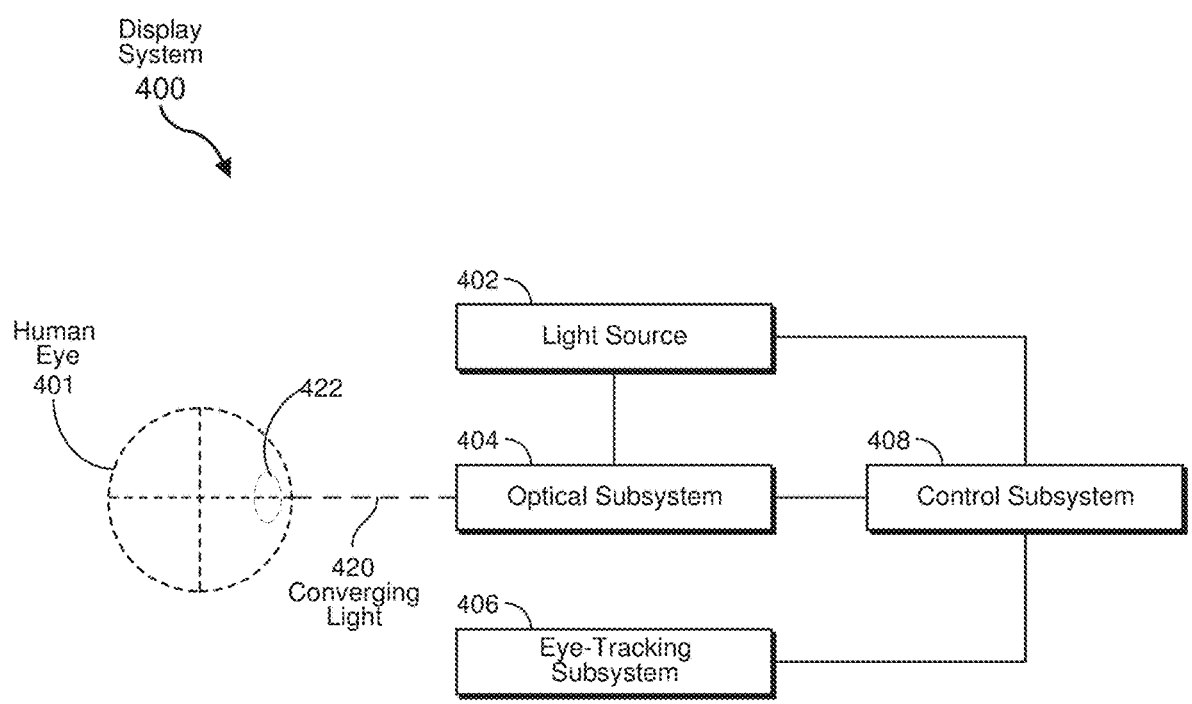
FIG. 4 is an illustration of an exemplary display system and eye-tracking subsystem capable of tracking a user's eye(s).

As detailed above, the disclosed systems may use various eye-tracking systems and/or algorithms to identify object(s) within scenes viewed by a user. FIG. 4 is an illustration of an exemplary display system that incorporates an eye-tracking subsystem capable of tracking a user's eye(s). As depicted in FIG. 4, display system 400 may include a light source 402, an optical subsystem 404, an eye-tracking subsystem 406, and/or a control subsystem 408. In some embodiments, subsystem and system may be used interchangeably depending on functions and/or operations executed by the display system 400 and any component thereof. In some examples, light source 402 may generate light for an image (e.g., to be presented to eye 401 of the viewer). The light source 402 may represent any of a variety of suitable devices. For example, the light source 402 can include a two-dimensional projector (e.g., a LCoS display), a scanning source (e.g., a scanning laser), or other device (e.g., a LCD, an LED display, an OLED display, an active-matrix OLED display (AMOLED), a transparent OLED display (TOLED), a waveguide, or some other display capable of generating light for presenting an image (e.g., a virtual image) to the viewer). In some examples, the image may represent a virtual image, which may refer to an optical image formed from the apparent divergence of light rays from a point in space, as opposed to an image formed from the light ray's actual divergence.

In some embodiments, optical subsystem 404 may receive the light generated by light source 402 and generate, based on the received light, converging light 420 that includes the image. In some examples, optical subsystem 404 may include any number of lenses (e.g., Fresnel lenses, convex lenses, concave lenses), apertures, filters, mirrors, prisms, and/or other optical components, possibly in combination with actuators and/or other devices. In particular, the actuators and/or other devices may translate and/or rotate one or more of the optical components to alter one or more aspects of converging light 420. Further, various mechanical couplings may serve to maintain the relative spacing and/or the orientation of the optical components in any suitable combination.

In one embodiment, eye-tracking subsystem 406 may generate tracking information indicating a gaze angle of an eye 401 of the viewer. In some examples, the phrase eye tracking may refer to a process by which the position, orientation, and/or motion of an eye is measured, detected, sensed, determined, and/or monitored. The disclosed systems may measure the position, orientation, and/or motion of an eye in a variety of different ways, such as using various optical-based eye-tracking techniques, ultrasound-based eye-tracking techniques, etc.

In one example, control subsystem 408 may control aspects of the optical subsystem 404 (e.g., the angle of incidence of converging light 420) based at least in part on this tracking information. Additionally, in some examples, control subsystem 408 may store and utilize historical tracking information (e.g., a history of the tracking information over a given duration, such as the previous second or fraction thereof) to anticipate the gaze angle of eye 401 (e.g., an angle between the visual axis and the anatomical axis of the eye 401). In some embodiments, eye-tracking subsystem 406 may detect radiation emanating from some portion of eye 401 (e.g., the cornea, the iris, the pupil, or the like) to determine the current gaze angle of eye 401. In other examples, the eye-tracking subsystem 406 may employ a wavefront sensor to track the current location of the pupil.

Any number of techniques can be used to track eye 401. Some techniques may involve illuminating eye 401 with infrared light and measuring reflections with at least one optical sensor that is tuned to be sensitive to the infrared light. Information about how the infrared light is reflected from eye 401 may be analyzed to determine the position(s), orientation(s), and/or motion(s) of one or more eye feature(s), such as the cornea, pupil, iris, and/or retinal blood vessels.

In some examples, the radiation captured by a sensor of eye-tracking subsystem 406 may be digitized (i.e., converted to an electronic signal). Further, the sensor may transmit a digital representation of this electronic signal to one or more processors (for example, processors associated with a device including eye-tracking subsystem 406).

Eye-tracking subsystem 406 may include any of a variety of sensors in a variety of different configurations. For example, eye-tracking subsystem 406 may include an infrared detector that reacts to infrared radiation. The infrared detector may be a thermal detector, a photonic detector, and/or any other suitable type of detector. Thermal detectors may include detectors that react to thermal effects of the incident infrared radiation.

In some examples, one or more processors may process the digital representation generated by the sensor(s) of eye-tracking subsystem 406 to track the movement of eye 401. In another example, these processors may track the movements of eye 401 by executing algorithms represented by computer instructions stored on non-transient memory. In some examples, on-chip logic (e.g., an application-specific integrated circuit, ASIC) may be used to perform at least portions of such algorithms.

As noted, eye-tracking subsystem 406 may be programmed to use an output of the sensor(s) to track movement of eye 401. In some embodiments, eye-tracking subsystem 406 may analyze the digital representation generated by the sensors to extract eye rotation information from changes in reflections. In one embodiment, eye-tracking subsystem 406 may use corneal reflections or glints (also known as Purkinje images) and/or the center of the eye's pupil 422 as features to track over time.

In some embodiments, eye-tracking subsystem 406 may use the center of the eye's pupil 422 and infrared or near-infrared, non-collimated light to create corneal reflections. In these embodiments, eye-tracking subsystem 406 may use the vector between the center of the eye's pupil 422 and the corneal reflections to compute the gaze direction of eye 401. In some embodiments, the disclosed systems may perform a calibration procedure for an individual (using, e.g., supervised or unsupervised techniques) before tracking the user's eyes. For example, the calibration procedure may include directing users to look at one or more points displayed on an NED while the eye-tracking system records the values that correspond to each gaze position associated with each point.

In some embodiments, eye-tracking subsystem 406 may use two types of infrared and/or near-infrared (also known as active light) eye-tracking techniques: bright-pupil and dark-pupil eye tracking, which may be differentiated based on the location of an illumination source with respect to the optical elements used. If the illumination is coaxial with the optical path, then eye 401 may act as a retroreflector as the light reflects off the retina, thereby creating a bright pupil effect similar to a red eye effect in photography. If the illumination source is offset from the optical path, then the eye's pupil 422 may appear dark because the retroreflection from the retina is directed away from the sensor. In some embodiments, bright-pupil tracking may create greater iris/pupil contrast, allowing more robust eye tracking with iris pigmentation, and may feature reduced interference (e.g., interference caused by eyelashes and other obscuring features). Bright-pupil tracking may also allow tracking in lighting conditions ranging from total darkness to a very bright environment.

In some embodiments, control subsystem 408 may control light source 402 and/or optical subsystem 404 to reduce optical aberrations (e.g., chromatic aberrations and/or monochromatic aberrations) of the image that may be caused by or influenced by the eye 401 of the viewer. In some examples, as mentioned above, control subsystem 408 may use the tracking information from eye-tracking subsystem 406 to perform such control. For example, in controlling light source 402, control subsystem 408 may alter the light generated by light source 402 (e.g., by way of image rendering) to modify (e.g., pre-distort) the image so that the aberration of the image caused by eye 401 is reduced.

The disclosed systems may track both the position and relative size of the pupil (since, e.g., the pupil dilates and/or contracts). In some examples, the eye-tracking devices and components (e.g., sensors and/or sources) used for detecting and/or tracking the pupil may be different (or calibrated differently) for different types of eyes. For example, the frequency range of the sensors may be different (or separately calibrated) for eyes of different colors and/or different pupil types, sizes, and/or the like. As such, the various eye-tracking components (e.g., infrared sources and/or sensors) described herein may need to be calibrated for each individual user and/or eye.

The disclosed systems may track both eyes with and without ophthalmic correction, such as contact lens worn by the user. In some embodiments, ophthalmic correction elements (e.g., adjustable lenses) may be directly incorporated into the user's artificial reality device. In some examples, the color of the user's eye may necessitate modification of a corresponding eye-tracking algorithm(s). For example, eye-tracking algorithm(s) may need to be modified based at least in part on the differing color contrast between a brown eye and, for example, a blue eye.

Figure 5:
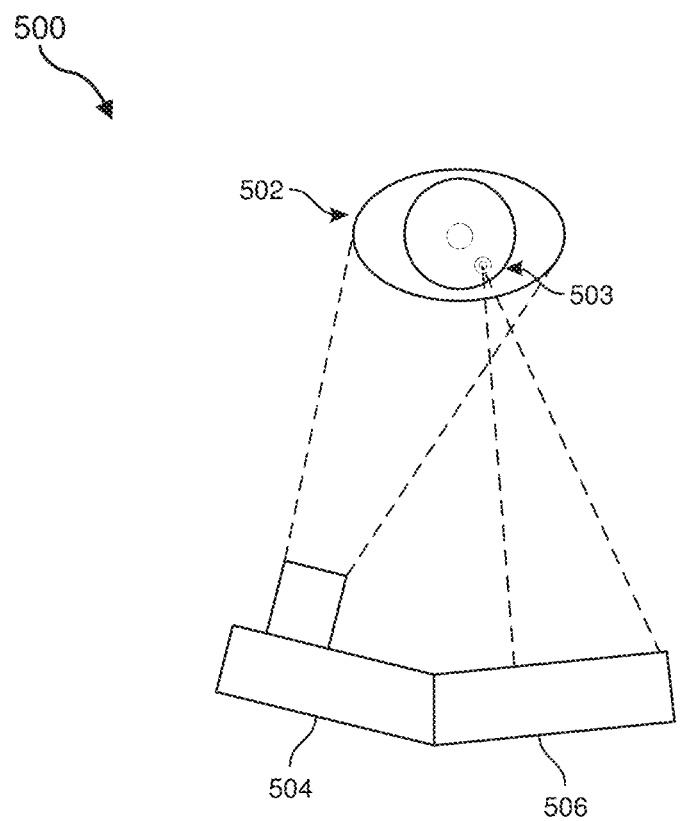
FIG. 5 is an illustration of an exemplary eye-tracking system designed to track various aspects of a user's eye(s).
Figure 5:
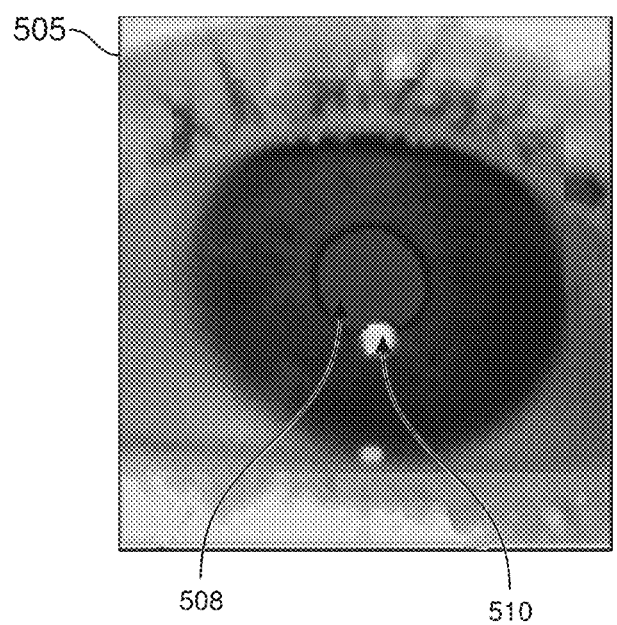

FIG. 5 is a more detailed illustration of various aspects of the eye-tracking subsystem illustrated in FIG. 4. As shown in this figure, eye-tracking subsystem may include at least one source 504 and at least one sensor 506. As detailed above, an NED or HMD (or a similar device) may use an eye-tracking subsystem similar to that illustrated in this figure to determine the user's gaze with respect to scenes and objects within various scenes and/or to filter or identify the set of object interaction commands that could apply to the same.

Source 504 generally represents any type or form of element capable of emitting radiation. In one example, source 504 may generate visible, infrared, and/or near-infrared radiation. In some examples, source 504 may radiate non-collimated infrared and/or near-infrared portions of the electromagnetic spectrum towards an eye 502 of a user. Source 504 may utilize a variety of sampling rates and speeds. For example, the disclosed systems may use sources with higher sampling rates in order to capture fixational eye movements of a user's eye 502 and/or to correctly measure saccade dynamics of the user's eye 502. As noted above, any type or form of eye-tracking technique may be used to track the user's eye 502, including optical-based eye-tracking techniques, ultrasound-based eye-tracking techniques, etc.

Sensor 506 generally represents any type or form of element capable of detecting radiation, such as radiation reflected off the user's eye 502. Examples of sensor 506 include, without limitation, a charge coupled device (CCD), a photodiode array, a complementary metal-oxide-semiconductor (CMOS) based sensor device, and/or the like. In one example, sensor 506 may represent a sensor having predetermined parameters, including, but not limited to, a dynamic resolution range, linearity, and/or other characteristic selected and/or designed specifically for eye tracking.

As detailed above, eye-tracking subsystem 500 may generate one or more glints 503. As detailed above, glint 503 may represent reflections of radiation (e.g., infrared radiation from an infrared source, such as source 504) from the structure of the user's eye. In various embodiments, the glint 503 and/or the user's pupil may be tracked using an eye-tracking algorithm executed by a processor (either within or external to the artificial reality device). For example, an artificial reality device may include a processor and/or memory in order to perform eye tracking locally and/or a transceiver to send and receive the data necessary to perform eye tracking on an external device (e.g., a mobile phone, cloud server, or other computing device).

FIG. 5 shows an example image 505 captured by an eye-tracking subsystem, such as eye-tracking subsystem 500. In this example, image 505 may include both the user's pupil 508 and a glint 510 near the same. In some examples, pupil 508 and/or glint 510 may be identified using an artificial-intelligence-based algorithm, such as a computer-vision-related algorithm. In one embodiment, image 505 may represent a single frame in a series of frames that may be analyzed continuously in order to track the eye 502 of the user. Further, the pupil 508 and/or glint 510 may be tracked over a period of time to determine a user's gaze and an associated dwell-time in relation to an object within a scene, as described further above. Once an object within a user's gaze having an associated dwell time is identified, the disclosed systems may identify, within a database of object interaction commands, a subset of commands that apply to the object viewed by the user, and present, to the user, the subset of commands that apply to the object.

Figure 6:
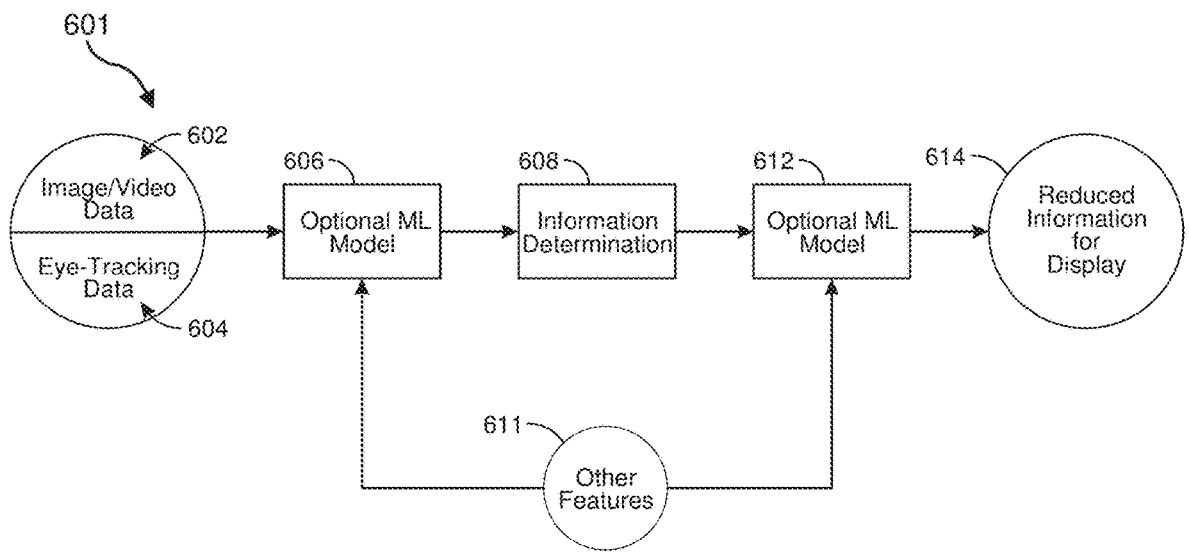
FIG. 6 is an illustration of example operations that may utilize eye tracking and artificial intelligence (AI) to improve user interactions with objects in artificial reality.

As detailed above, the systems described herein may utilize various artificial intelligence and machine-learning techniques to improve user interactions with objects in artificial reality. FIG. 6 is an example illustration of such techniques.

The various operations shown in FIG. 6 may be implemented in software and/or hardware using any suitable technique. Moreover, a dedicated AI chipset may perform at least a portion of the example operations illustrated in this figure in order to reduce (based on, e.g., data gathered by an eye-tracking subsystem) the size of the library of commands described above. In one embodiment, a device (e.g., an NED and/or an HMD) worn by a user and/or a user device (e.g., mobile phone, a laptop, a tablet, a computer, and/or the like) may perform at least a portion of the operations illustrated in this figure. Furthermore, the example operations illustrated in this figure may utilize or rely on data from additional devices (i.e., data gathered from non-eye-tracking subsystems), such as keyboards, mice, touch screens, motion input devices, movement input devices, audio input devices, handheld controllers, keypads, etc. In some examples, the data from these additional devices may help increase the accuracy of the overall system. For example, the data obtained from these additional devices may be used to train one or more of the eye-tracking and/or object-identification algorithms described herein.

As shown in FIG. 6, image or video data (e.g., visual information 602) may serve as input features to machine-learning subsystem 601. In particular, visual information 602 may include digital representations of images and/or videos, which may include representations of scenes and/or objects in the user's field of view. These images and/or videos may include, but not be limited to, three-dimensional (3D) video and/or images and/or two-dimensional (2D) videos and/or images having a predetermined duration. The disclosed systems may obtain visual information 602 in a variety of ways, including from external-facing cameras or other sensors incorporated into the artificial reality system, from social media sites, and/or from an external device (e.g., a mobile phone, a camera, a video camera, a server, and/or the like). In one embodiment, the disclosed systems may pre-process visual information 602 before inputting the same into machine-learning subsystem 601 (which may, for example, represent a neural network, such as a convolutional neural network).

In some embodiments, the disclosed systems may generate latent space based on the data contained within visual information 602. For example, the disclosed systems may generate a 2D representation from 3D data, or may generate a lower-dimensional 2D feature set from denser 2D data, such as photos. In another embodiment, the disclosed systems may process visual information 602 using image segmentation in order to partition a digital image and/or video into multiple segments (e.g., sets of pixels). The disclosed systems may also perform image segmentation to simplify and/or change the representation of visual information 602 into a representation that may be more readily processed using the computational resources of a resource-limited device (such as an NED or HMD).

In some examples, visual information 602 input may include additional information including, but not limited to, the number of samples involved (e.g., the number of visual representations), the height of each sample (e.g., the height of each visual representation), the width of each sample (e.g., the width of each visual representation), the number of channels (i.e., the color specification of the visual representations), and/or colored video or images corresponding to red, green, and/or blue pixels (e.g., such that each visual representation includes three channels).

As shown in FIG. 6, machine-learning subsystem 601 may also include eye-tracking data 604, which may include a 2 or 3-tuple representing X, Y or X, Y, Z locations, respectively, which may correspond to the center of focus of a user's gaze. In one example, eye-tracking data 604 may be obtained using an eye-tracking subsystem, as variously described herein, for example, in connection with FIGS. 4 and 5. In one embodiment, eye-tracking data 604 may include 2 or 3 tuples representing gaze vectors that correspond to the gaze direction of a user's eye at a given time. In other embodiments, the disclosed systems may determine the 2 or 3 tuples representing the center of focus and/or the gaze vectors using various eye-tracking algorithms.

In one embodiment, eye-tracking data 604 may represent time-series data; that is, data having a particular order in time. In another aspect, eye-tracking data 604 may include dwell time data, which may represent the amount of time that the eye is focused at a particular location. In some examples, a sensor in combination with a source used for illuminating the eye may be used to capture eye-tracking data 604 in order to identify the pupil and/or glints reflected from the user's eye, as detailed above. The disclosed systems may obtain eye-tracking data 604 in real time or near real time and/or may obtain the same in an offline fashion (e.g., to serve as training data or test data).

In some embodiments, the data size of eye-tracking data 604 may be reduced to conform with the specifications of the eye-tracking device's processing power. For example, the disclosed systems may filter eye-tracking data 604 to reduce the number of X, Y, Z locations representing the center of focus in a gaze and/or the X, Y coordinates representing the gaze vectors of the eye. In another embodiment, the disclosed systems may down-sample the eye-tracking data 604 in time such that a fewer number of data points represent eye-tracking data 604.

As detailed above, the disclosed systems may identify object(s) within a scene viewed by a user using artificial intelligence, such as via an optional machine-learning (ML) model 606. Optional machine learning model 606 generally represents any suitable machine learning model capable of determining objects in a given scene in an artificial reality environment. In one example, optional ML model 606 may represent a neural network, such as a convolutional neural network. In this example, the neural network may process images and/or videos within the user's field of view in order to identify the scenes and/or objects in the user's field of view. In some examples, optional ML model 606 may include an object recognition algorithm based on one or more computer-vision techniques. In another embodiment, the disclosed systems may use optional ML model 606 (which may include a scene-analysis technique) to interpret what the user is looking at a given time. Further, optional ML model 606 may use, as input, parameters that are related to a user's location (e.g., a user's location as determined by a global positioning system, an indoor mapping device, an outdoor mapping device, combinations thereof, and/or the).

As shown in FIG. 6, machine-learning subsystem 601 may also include an information determination 608 module, which may determine a reduced set of commands associated with the scene in the user's field of view from a larger set of commands (e.g., a larger set of possible commands in a broader library and/or database of user-executable commands), as shown and described in connection with FIG. 3 above. In one embodiment, information determination 608 module may identify the reduced set of commands described above, which may represent a subset of all commands available within a given artificial reality system at a given time. In some embodiments, the reduced library set of commands may be based at least partly on the results of an object recognition algorithm used in connection with optional machine-learning model 606, which may identify a given scene and/or object. In the example of a scene including a living room, the disclosed systems may determine a subset of commands associated with the living room and may preload the subset of commands into a memory cache of the device that the user is wearing (e.g., an NED and/or an HMD).

Machine-learning subsystem 601 may also include a features 611 block. Features 611 block may include a variety of additional features, including, but not limited to, one or more social media profiles associated with a user, demographic information associated with a user (e.g., age, race, gender, and/or the like), historical commands or data associated with a given user or other users in the same scene and/or with similar objects as a given scene, combinations thereof, and/or the like. In one embodiment, features 611 may include various physiological and/or physical responses of a user; including, but not limited to, eye squinting behavior of a user, pupil dilation characteristics of an eye of a user, rapid-eye movements (REM) of an eye of a user, saccade movements of an eye of a user, patterns associated with the eyebrows of a user, forehead wrinkles and/or eye-crows associated with the face of a user, smiles, frowns, and/or other facial expressions of a user, sweat detected from one or more sensors (e.g., sensors associated with the HMD and/or NED), increased facial temperatures (e.g., as determined, for example, using an infrared sensor), combinations thereof, and/or the like.

In some embodiments, features 611 may include metadata associated with an object in the scene or metadata associated with objects in the scene or with the scene itself, including keywords, tags, control information, descriptions associated with the object and/or with the scene, combinations thereof, and/or the like. In another embodiment, features 611 may include additional device inputs (e.g., input from a handheld controller, laser, mouse, keyboard, speech, and/or the like) provided by a user.

Machine-learning subsystem 601 may also include a second optional ML model 612, which generally represents any suitable machine-learning model for determining eye tracking and/or objects associated with a scene in the user's gaze. In one example, optional ML model 612 may represent or include a neural network, such as a convolutional neural network. Additionally or alternatively, optional ML model 612 may also represent or include an object-recognition algorithm, a scene-generation algorithm, an eye-tracking algorithm, and/or the like.

In some examples, optional ML model 612 may output predicted user interests, for example, using a mathematical vector that corresponds to user interests. In another embodiment, optional ML model 612 may output a mathematical vector that corresponds to a predicted user's reaction. In some embodiments, optional ML model 612 may output a category of possible predicted commands that a user may request in connection with an object or a group of objects in the user's field of view. In one example, optional ML model 612 may output information associated with an object's ID (e.g., a lamp, an IoT device, and/or the like).

As shown in FIG. 6, machine-learning subsystem 601 may generate reduced information 614 (e.g., information corresponding to a reduced subset of object interaction commands, as described above) for display to a user. In one example, reduced information 614 may have a lower dimensionality (e.g., reduced size, reduced content, reduced information, etc.) with respect to the information determined at information determination block 608. In this example, the disclosed systems may display reduced information 614 to a user, as shown and described in connection with second menu 218 of FIG. 2, described above.

As noted, the disclosed systems may use various AI-based algorithms and techniques for carrying out the various embodiments and/or examples disclosed herein. In particular, the AI-based algorithms and techniques described herein may provide for or aid in the numerous determinations (e.g., to determine, identify, ascertain, infer, calculate, predict, prognose, estimate, derive, forecast, detect, compute, etc.) described herein. For example, the components described herein can examine the entirety or a subset of the data to which it is granted access and can provide reasoning about or determine states of the system, environment, etc. from a set of observations, as captured via events and/or data. Determinations can be employed to identify a specific context or action to generate, for example, a probability distribution over states. In one example, these determinations may be probabilistic; that is, they may involve the computation of a probability distribution over states of interest based on a consideration of data and events. These determinations can also refer to techniques employed for composing higher-level events from a set of events and/or data.

Such determinations can result in the construction of new events or actions from a set of observed events and/or stored event data, whether the events are correlated in close temporal proximity and/or whether the events and data originate from one or several event and/or data sources (e.g., different sensor inputs). The systems and components disclosed herein may also employ various classifications, both explicitly trained (e.g., via training data) and implicitly trained (e.g., via observing behavior, preferences, historical information, receiving extrinsic information, etc.), schemes, and/or systems (e.g., support vector machines, neural networks, expert systems, Bayesian belief networks, fuzzy logic, data fusion engines, etc.) when performing the automatic and/or determined actions disclosed herein. As such, the disclosed systems may use classification schemes and/or systems to automatically learn and/or perform a number of functions, actions, and/or determinations.

For example, a classifier may map an input attribute vector, $z=(z1, z2, z3, z4, zn)$ to a confidence that the input belongs to a class, as represented by $f(z)=confidence(class)$. Such classifications can employ a probabilistic and/or statistical-based analysis (e.g., factoring into the analysis utilities and costs) to determinate an action to be automatically performed. A support vector machine (SVM) is one example of such a classifier. This SVM may operate by finding a hyper-surface in the space of possible inputs, where the hyper-surface attempts to split the triggering criteria from the non-triggering events. This may make the classification correct for testing data that is near, but not identical to training data. Other directed and undirected model classification approaches include, for example, naïve Bayes and Bayesian networks, decision trees, neural networks, fuzzy logic models, and/or probabilistic classification models providing different patterns of independence.

Figure 7:
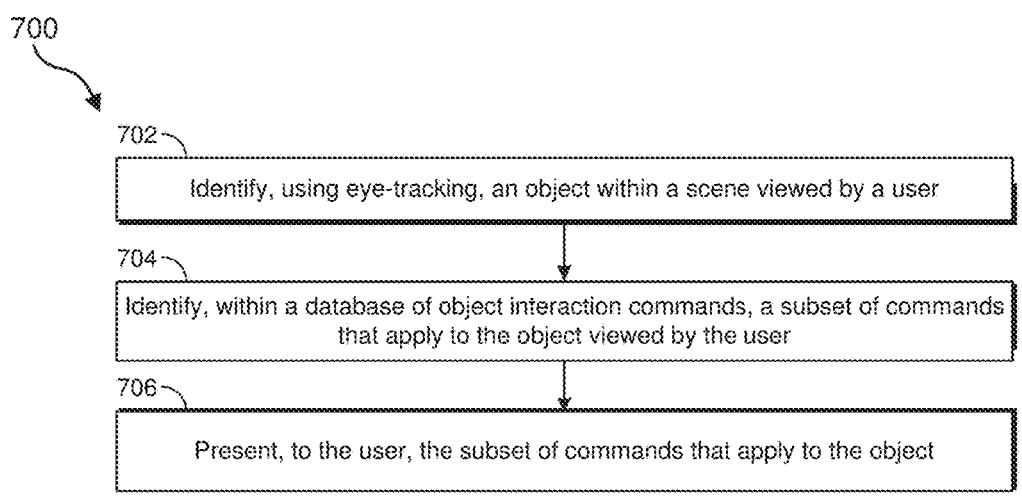
FIG. 7 is an illustration of an exemplary method for using eye tracking to improve user interactions with objects in artificial reality.

FIG. 7 is an illustration of an exemplary method 700 for using eye tracking to improve user interactions with objects in artificial reality. At block 702, the method may include identifying, using eye tracking, an object within a scene viewed by a user. Any number of suitable eye-tracking systems and techniques can be used, including those described and illustrated in connection with FIGS. 4 and 5. For example, the disclosed systems may use a technique involving illuminating, using an eye-tracking system, the eye with infrared light and measuring reflections with at least one optical sensor that is tuned to be sensitive to the infrared light. Further, the disclosed systems may analyze information about how the infrared light is reflected from the eye to determine the position(s), orientation(s), and/or motion(s) of one or more eye feature(s), such as the cornea, pupil, iris, and/or retinal blood vessels.

In some examples, the disclosed systems may digitize (i.e., convert to an electronic signal) the radiation captured by an eye-tracking system. In these examples, the disclosed systems may transmit a digital representation of this electronic signal to one or more processors of the eye-tracking system, which may execute computer-readable instructions configured to execute an eye-tracking algorithm.

As noted, the eye-tracking systems described herein may be programmed to use an output of the sensor(s) to track movement of a user's eye(s). In some embodiments, the disclosed systems may analyze a digital representation generated by the sensors to extract eye rotation from changes in reflections. In one embodiment, the disclosed systems may use glints and/or corneal reflections and/or the center of the eye's pupil as features to track over time.

At block 704, the method may include identifying, within a database of object interaction commands, a subset of commands that apply to the object viewed by the user. The systems described herein can identify this subset of commands in a variety of ways, including using the machine-learning-based techniques described and illustrated in connection with FIG. 6.

At block 706, the method may include presenting, to the user, the subset of commands that apply to the object. As detailed above, the disclosed systems may present this subset of commands using any suitable display technology, such as via an LCD display, an LED display, a microLED display, an OLED display, a LCOS display, a waveguide, and/or the like. In addition, the disclosed systems may present the subset of commands via audio playback and/or via tactile and/or haptic feedback.

As detailed above, in some examples the disclosed systems may also obtain user input indicative of a selection of a command to be executed by the artificial reality system. For example, the disclosed systems may obtain user input based on user interactions with an artificial reality interface. In response, the disclosed systems may execute the selected command (e.g., the disclosed systems may turn up the volume of an IoT speaker in the user's field of view), as detailed above. Upon execution of block 706, the control flow of method 700 may terminate.

As detailed above, embodiments of the present disclosure may include or be implemented in conjunction a cloud-computing system. Cloud computing can refer to a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud-computing environment may include one or more cloud computing nodes with which local computing devices used by cloud consumers (such as personal digital assistants or cellular phones, desktop or laptop computers, and/or automobile computer systems) can communicate. In a cloud-computing system, nodes can communicate with one another. They can be grouped physically or virtually, in one or more networks, such as private, community, public, or hybrid clouds. This allows cloud-computing environment to offer infrastructure, platforms, and/or software as services for which a cloud consumer does not need to maintain resources on a local computing device. In some examples, a cloud-computing system can communicate with any type of computerized device over any type of network and/or network-addressable connection (using, e.g., a web browser).

Embodiments of the present disclosure may also include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without NEDs, an example of which is AR system 800 in FIG. 8. Other artificial reality systems may include an NED that also provides visibility into the real world (e.g., AR system 900 in FIG. 9) or that visually immerses a user in an artificial reality (e.g., VR system 1000 in FIG. 10). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Figure 8:
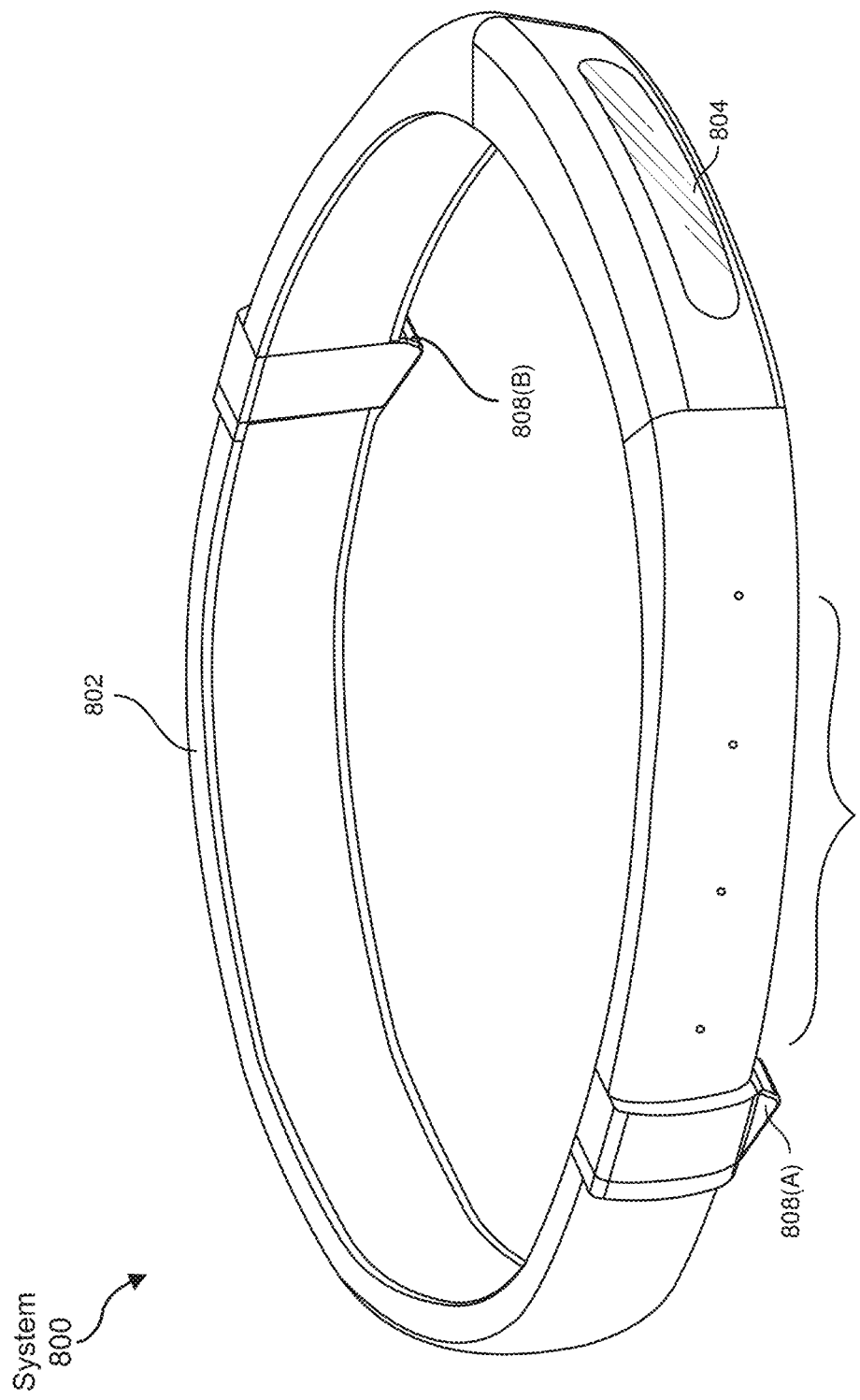
FIG. 8 is an illustration of an exemplary AR system dimensioned to fit about a body part (e.g., a head) of a user.

Turning to FIG. 8, AR system 800 generally represents a wearable device dimensioned to fit about a body part (e.g., a head) of a user. As shown in FIG. 8, AR system 800 may include a frame 802 and a camera assembly 804 that is coupled to frame 802 and configured to gather information about a local environment by observing the local environment. AR system 800 may also include one or more audio devices, such as output audio transducers 808(A) and 808(B) and input audio transducers 810. Output audio transducers 808(A) and 808(B) may provide audio feedback and/or content to a user, and input audio transducers 810 may capture audio in a user's environment.

As shown, AR system 800 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 800 may not include an NED, AR system 800 may include other types of screens or visual feedback devices (e.g., a display screen integrated into a side of frame 802).

Figure 9:
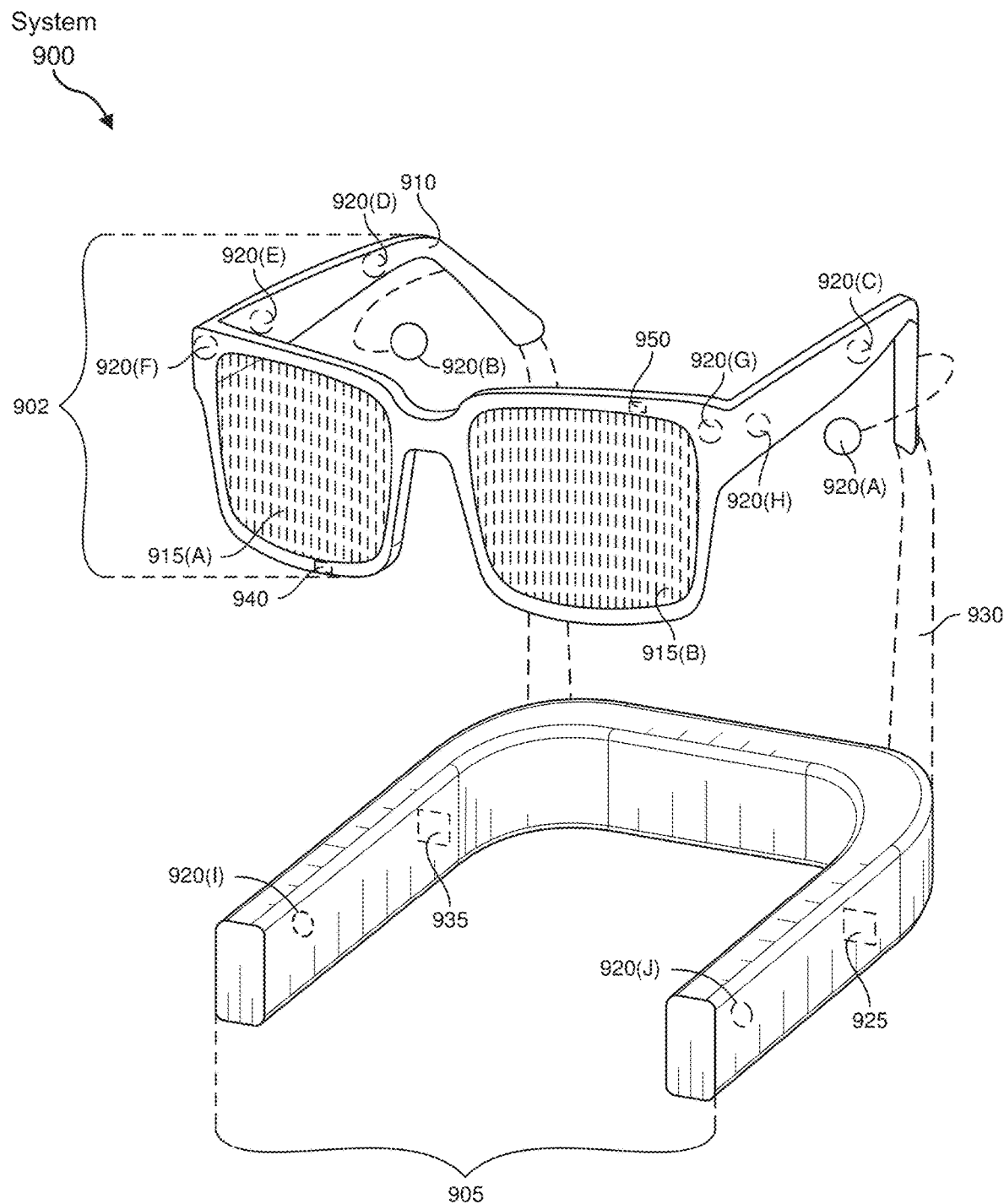
FIG. 9 shows an exemplary AR system including an eyewear device with a frame configured to hold a left display device and a right display device in front of a user's eyes.

The embodiments discussed in this disclosure may also be implemented in AR systems that include one or more NEDs. For example, as shown in FIG. 9, AR system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While AR system 900 includes two displays, embodiments of this disclosure may be implemented in AR systems with a single NED or more than two NEDs.

In some embodiments, AR system 900 may include one or more sensors, such as sensor 940. Sensor 940 may generate measurement signals in response to motion of AR system 900 and may be located on substantially any portion of frame 910. Sensor 940 may include a position sensor, an inertial measurement unit (IMU), a depth camera assembly, or any combination thereof. In some embodiments, AR system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

AR system 900 may also include a microphone array with a plurality of acoustic sensors 920(A)-920(J), referred to collectively as acoustic sensors 920. Acoustic sensors 920 may be transducers that detect air pressure variations induced by sound waves. Each acoustic sensor 920 may be configured to detect sound and convert the detected sound into an electronic format (e.g., an analog or digital format). The microphone array in FIG. 9 may include, for example, ten acoustic sensors: 920(A) and 920(B), which may be designed to be placed inside a corresponding ear of the user, acoustic sensors 920(C), 920(D), 920(E), 920(F), 920(G), and 920(H), which may be positioned at various locations on frame 910, and/or acoustic sensors 920(1) and 920(J), which may be positioned on a corresponding neckband 905.

The configuration of acoustic sensors 920 of the microphone array may vary. While AR system 900 is shown in FIG. 9 as having ten acoustic sensors 920, the number of acoustic sensors 920 may be greater or less than ten. In some embodiments, using higher numbers of acoustic sensors 920 may increase the amount of audio information collected and/or the sensitivity and accuracy of the audio information. In contrast, using a lower number of acoustic sensors 920 may decrease the computing power required by the controller 950 to process the collected audio information. In addition, the position of each acoustic sensor 920 of the microphone array may vary. For example, the position of an acoustic sensor 920 may include a defined position on the user, a defined coordinate on the frame 910, an orientation associated with each acoustic sensor, or some combination thereof.

Acoustic sensors 920(A) and 920(B) may be positioned on different parts of the user's ear, such as behind the pinna or within the auricle or fossa. Or, there may be additional acoustic sensors on or surrounding the ear in addition to acoustic sensors 920 inside the ear canal. Having an acoustic sensor positioned next to an ear canal of a user may enable the microphone array to collect information on how sounds arrive at the ear canal. By positioning at least two of acoustic sensors 920 on either side of a user's head (e.g., as binaural microphones), AR device 900 may simulate binaural hearing and capture a 3D stereo sound field around about a user's head. In some embodiments, acoustic sensors 920(A) and 920(B) may be connected to AR system 900 via a wired connection, and in other embodiments, the acoustic sensors 920(A) and 920(B) may be connected to AR system 900 via a wireless connection (e.g., a Bluetooth connection). In still other embodiments, acoustic sensors 920(A) and 920(B) may not be used at all in conjunction with AR system 900.

Acoustic sensors 920 on frame 910 may be positioned along the length of the temples, across the bridge, above or below display devices 915(A) and 915(B), or some combination thereof. Acoustic sensors 920 may be oriented such that the microphone array is able to detect sounds in a wide range of directions surrounding the user wearing the AR system 900. In some embodiments, an optimization process may be performed during manufacturing of AR system 900 to determine relative positioning of each acoustic sensor 920 in the microphone array.

AR system 900 may further include or be connected to an external device (e.g., a paired device), such as neckband 905. As shown, neckband 905 may be coupled to eyewear device 902 via one or more connectors 930. Connectors 930 may be wired or wireless connectors and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof. Furthermore, neckband 905 generally represents any type or form of paired device. Thus, the following discussion of neckband 905 may also apply to various other paired devices, such as smart watches, smart phones, wrist bands, other wearable devices, hand-held controllers, tablet computers, laptop computers, etc.

Pairing external devices, such as neckband 905, with AR eyewear devices may enable the eyewear devices to achieve the form factor of a pair of glasses while still providing sufficient battery and computation power for expanded capabilities. Some or all of the battery power, computational resources, and/or additional features of AR system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling an artificial reality environment to be incorporated more fully into a user's day-to-day activities.

Neckband 905 may be communicatively coupled with eyewear device 902 and/or to other devices. The other devices may provide certain functions (e.g., tracking, localizing, depth mapping, processing, storage, etc.) to AR system 900. In the embodiment of FIG. 9, neckband 905 may include two acoustic sensors (e.g., 920(1) and 920(J)) that are part of the microphone array (or potentially form their own microphone subarray). Neckband 905 may also include a controller 925 and a power source 935.

Acoustic sensors 920(I) and 920(J) of neckband 905 may be configured to detect sound and convert the detected sound into an electronic format (analog or digital). In the embodiment of FIG. 9, acoustic sensors 920(I) and 920(J) may be positioned on neckband 905, thereby increasing the distance between the neckband acoustic sensors 920(I) and 920(J) and other acoustic sensors 920 positioned on eyewear device 902. In some cases, increasing the distance between acoustic sensors 920 of the microphone array may improve the accuracy of beamforming performed via the microphone array. For example, if a sound is detected by acoustic sensors 920(C) and 920(D) and the distance between acoustic sensors 920(C) and 920(D) is greater than, e.g., the distance between acoustic sensors 920(D) and 920(E), the determined source location of the detected sound may be more accurate than if the sound had been detected by acoustic sensors 920(D) and 920(E).

Controller 925 of neckband 905 may process information generated by the sensors on neckband 905 and/or AR system 900. For example, controller 925 may process information from the microphone array that describes sounds detected by the microphone array. For each detected sound, controller 925 may perform a DoA estimation to estimate a direction from which the detected sound arrived at the microphone array. As the microphone array detects sounds, controller 925 may populate an audio data set with the information. In embodiments in which AR system 900 includes an inertial measurement unit, controller 925 may compute all inertial and spatial calculations from the IMU located on eyewear device 902. Connector 930 may convey information between AR system 900 and neckband 905 and between AR system 900 and controller 925. The information may be in the form of optical data, electrical data, wireless data, or any other transmittable data form. Moving the processing of information generated by AR system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial reality systems may, instead of blending an artificial reality with actual reality, substantially replace one or more of a user's sensory perceptions of the real world with a virtual experience. One example of this type of system is a head-worn display system, such as VR system 1000 in FIG. 10, that mostly or completely covers a user's field of view. VR system 1000 may include a front rigid body 1002 and a band 1004 shaped to fit around a user's head. VR system 1000 may also include output audio transducers 1006(A) and 1006(B). Furthermore, while not shown in FIG. 10, front rigid body 1002 may include one or more electronic elements, including one or more electronic displays, one or more inertial measurement units (IMUS), one or more tracking emitters or detectors, and/or any other suitable device or system for creating an artificial reality experience.

Artificial reality systems may include a variety of types of visual feedback mechanisms. For example, display devices in AR system 900 and/or VR system 1000 may include one or more liquid crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 900 and/or VR system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 800, AR system 900, and/or VR system 1000 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 8 and 10, output audio transducers 808(A), 808(B), 1006(A), and 1006(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 810 may include condenser microphones, dynamic microphones, ribbon microphones, and/or any other type or form of input transducer. In some embodiments, a single transducer may be used for both audio input and audio output.

Figure 10:
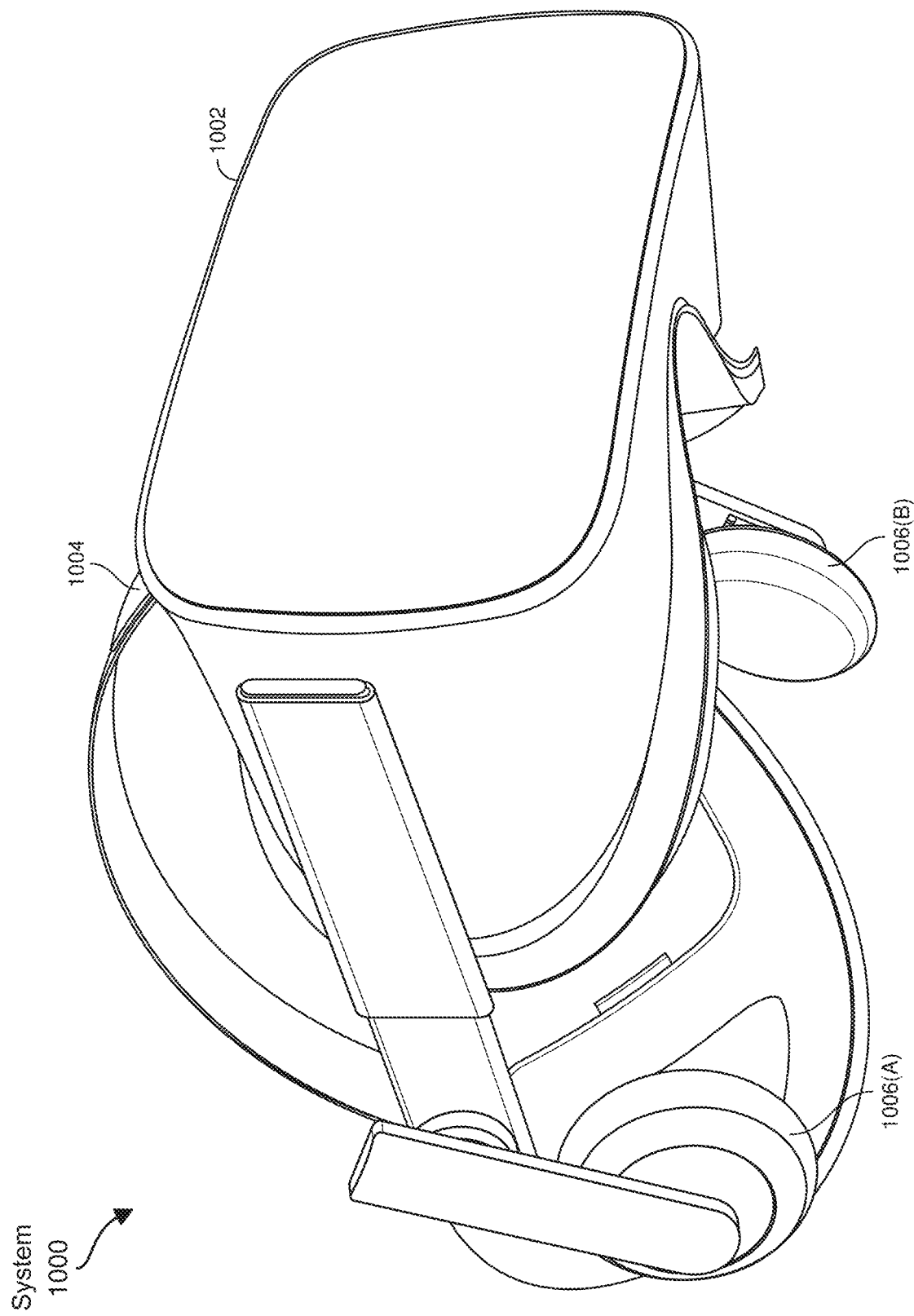
FIG. 10 shows a head-worn display system, such as a VR system, that mostly or completely covers a user's field of view.

While not shown in FIGS. 8-10, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visuals aids, etc.). The embodiments disclosed herein may enable or enhance a user's artificial reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    identifying, using an eye-tracking system, an object within a scene viewed by a user;
    identifying, within a database of object interaction commands, a subset of commands that apply to the object viewed by the user; and
    presenting, to the user, the subset of commands that apply to the object,
    wherein identifying the subset of commands comprises:
        generating a neural network; and
        inputting vectors corresponding to both a center of focus of an eye gaze of the user and features associated with the object to the neural network.

2. The computer-implemented method of claim 1, further comprising: identifying one or more physical responses of the user with respect to the object; and inputting additional features corresponding to the physical responses to the neural network.

3. The computer-implemented method of claim 1, wherein the subset of commands comprises at least one of a tag, control information, or a keyword associated with the object.

4. The computer-implemented method of claim 1, further comprising receiving user input associated with the subset of commands that apply to the object, the user input comprising at least one of:
    at least a portion of an utterance by the user; or
    at least a portion of a gesture performed by the user.

5. The computer-implemented method of claim 4, wherein:
    the user input comprises a selection of a command to be executed in connection with the object; and
    the method further comprises executing, in response to receiving the user input, the selected command.

6. The computer-implemented method of claim 1, wherein presenting the subset of commands comprises at least one of:
    displaying, using an artificial reality device, the subset of commands in the user's field of view;
    presenting the subset of commands using an audio device; or
    presenting the subset of commands using a tactile display.

7. The computer-implemented method of claim 1, wherein the subset of commands represents less than all of the entirety of commands in the database.

8. The computer-implemented method of claim 1, further comprising identifying setting information associated with the object.

9. A device, comprising:
    at least one memory device that stores computer-executable instructions; and
    at least one processor configured to access the memory device, wherein the processor is configured to execute the computer-executable instructions to:
        identify, using an eye-tracking subsystem, an object within a scene viewed by a user;
        identify, within a database of object interaction commands, a subset of commands that apply to the object viewed by the user;
        present, to the user, the subset of commands that apply to the object; and
        reduce the subset of commands to a list of available commands based on a user input.

10. The device of claim 9, wherein identifying the subset of commands comprises:
    generating a neural network; and
    inputting vectors corresponding to both an eye gaze of the user and features associated with the object to the neural network.

11. The device of claim 9, wherein the processor is further configured to execute the computer-executable instructions to:
    identify one or more physical responses of the user with respect to the object; and
    input features corresponding to the physical responses to a neural network.

12. The device of claim 9, wherein the processor is further configured to execute the computer-executable instructions to receive user input associated with the subset of commands that apply to the object.

13. The device of claim 12, wherein the user input comprises at least one of:
    at least a portion of an utterance by the user; or
    at least a portion of a gesture performed by the user.

14. The device of claim 9, wherein presenting the subset of commands comprises at least one of:
- displaying, using an artificial reality device, the subset of commands in the user's field of view;
- presenting the subset of commands using an audio device; or
- presenting the subset of commands using a tactile display.

15. The device of claim 9, wherein the processor is further configured to execute the computer-executable instructions to:
- receive user input comprising a selection of a command to be executed in connection with the object; and
- execute, in response to receiving the user input, the selected command.

16. A non-transitory computer-readable medium storing computer-executable instructions that, when executed by at least one processor, cause the processor to perform operations comprising:
- identifying, within a database of object interaction commands, a library of commands applicable to a scene viewed by a user;
- identifying, using an eye tracking system, an object within the scene viewed by the user;
- identifying, within the library of commands applicable to the scene viewed by the user, a subset of commands that apply to the object viewed by the user; and
- presenting, to the user, the subset of commands that apply to the object.

17. The non-transitory computer-readable medium of claim 16, wherein identifying the subset of commands comprises:
- generating a neural network; and
- inputting vectors corresponding to an eye gaze of the user and features associated with the object to the neural network.

18. The non-transitory computer-readable medium of claim 17, wherein the computer-executable instructions further comprise computer-executable instructions to:
- identify one or more physical responses of the user with respect to the object; and
- input features corresponding to the physical responses to the neural network.

19. The non-transitory computer-readable medium of claim 16, wherein the computer-executable instructions further comprise computer-executable instructions to receive user input associated with the subset of commands that apply to the object, the user input comprising at least one of:
- at least a portion of an utterance by the user; or
- at least a portion of a gesture performed by the user.

* * * * *